United States Patent [19]

Shimizu

[11] Patent Number: 4,609,993
[45] Date of Patent: Sep. 2, 1986

[54] GRAPHIC DISPLAY SYSTEM HAVING ANALOG INTERPOLATORS

[75] Inventor: Kyoichi Shimizu, Yokohama, Japan

[73] Assignee: Victor Company of Japan, Limited, Japan

[21] Appl. No.: 532,975

[22] Filed: Sep. 16, 1983

[30] Foreign Application Priority Data

Sep. 17, 1982 [JP] Japan .............................. 57-162059

[51] Int. Cl.$^4$ ............................ G09B 9/08; G09B 1/02
[52] U.S. Cl. .................................... 364/522; 340/703; 364/521
[58] Field of Search ................ 364/521, 522; 340/700, 340/703, 711, 825.7

[56] References Cited

U.S. PATENT DOCUMENTS

| | | | |
|---|---|---|---|
| 3,602,702 | 8/1971 | Warnock | 364/522 |
| 3,621,214 | 11/1971 | Romney et al. | 364/522 |
| 3,996,673 | 12/1976 | Vorst et al. | 364/521 X |
| 4,017,985 | 4/1977 | Heartz | 434/2 |
| 4,475,104 | 10/1984 | Shen | 340/703 |

Primary Examiner—Errol A. Krass
Assistant Examiner—H. R. Herndon
Attorney, Agent, or Firm—Lowe, Price, LeBlanc, Becker & Shur

[57] ABSTRACT

In a graphic display system a plurality of sets of first, second and third geometrical digital signals and a pictorial signal are stored in a memory and read therefrom at the raster speed of a display unit into plural latches with which plural interpolators are respectively associated. The first and second signals represent the gradients of the planes of a solid object with respect to the two axes of a coordinate system respectively, and the third signal represents the depth of a point lying on each edge of the object. Each interpolator converts the first gradient signal from the associated latch to a corresponding voltage and includes a proportioning circuit that scales the voltage as a function of the second gradient signal and as a function of a fourth signal representing the location of a scan point. Proportioned signals from the interpolators are summed respectively with the associated third signals to indicate the instantaneous values of the depths of the planes as a function of the raster scan. The summed signals are compared with each other to detect the one having a smallest magnitude to enable the pictorial signal of the desired plane.

6 Claims, 9 Drawing Figures

GRAPHIC DISPLAY SYSTEM HAVING ANALOG INTERPOLATORS

BACKGROUND OF THE INVENTION

The present invention relates to a graphic display system which operates at high speed to provide real time display.

Conventional graphic display systems comprise a central processing unit, a frame memory in which display data are stored, a controller that controls the frame memory and a graphic display unit to transfer the stored information from the memory to the display unit by way of a digital-analog converter. The CPU is supplied with various items of prestored information on the location of apexes of solid objects, the luminance and chromatic information of each polygonal surface of the objects and the position of a light source relative to the objects and items of variable information on the angle, position and direction of the point from which the objects are viewed. The CPU is programmed to provide perspective conversion, interconnection between apexes by interpolating the data on the locations of the apexes. These processed data are fed to the frame memory and retrieved therefrom to provide hidden surface processing during display operation. This involves making a decision on which plane or planes are to be hidden behind the desired; the decision is conventionally performed by a series of programmed instructions.

Because of the great number of picture elements for which the hidden surface processing must be performed, it takes a substantial amount of time to complete the display of a whole image, typically several minutes to several tens of minutes depending on the amount of information to be processed for each picture element. Therefore, the usual practice involves the use of a recording medium for storing the computed display data at a low speed and playing it back at the speed of a television raster scan speed.

SUMMARY OF THE INVENTION

It is therefore an object of the invention to eliminate the need for a recording system for graphic display and enable a computer-derived image to be displayed on a real time basis at the same speed as display data are read out of a memory.

This object is obtained by the use of analog interpolators which compute data values supplied from a frame memory at a speed much higher than that taken by a series of programmed logical steps.

The graphic display system of the invention comprises a memory for storing a plurality of sets of first, second and third digital geometrical signals and a digital pictorial signal. The first and second signals represent the gradients of the planes of one or more solid bodies with respect to first and second axes of a coordinate system, respectively; the third signal represents the location, or depth, of a point which lies on each edge of the solid body and is expressed in terms of the first axis. The geometric and pictorial signals of each set are stored in a location addressable as a function of time. During display operations, the memory is addressed at a speed synchronized with a display unit to transfer the addressed geometrical and pictorial signals sequentially to a plurality of latches.

The system includes a plurality of interpolators associated respectively with the latches. Each interpolator includes a first digital-analog converter for converting the first signal from the associated latch into a corresponding voltage, an analog proportioning circuit for proportioning the voltage as a function of the second signal and as a function of a fourth signal representing the location of a raster scan point to generate a proportioned voltage, and an analog-digital converter for converting the proportioned voltage to a corresponding digital signal. The digital signals of the interpolators are respectively summed with the third signals stored in the associated latches so that the summed values represent the instantaneous values of depths of the planes as the raster scan moves from point to point. The summed digital signals are compared with each other to detect the digital signal having the smallest magnitude. The pictorial signal associated with the detected digital signal is applied to a second digital-analog converter for conversion to an analog video signal for application to a graphic display unit.

Since the proportioning circuit is capable of processing the input digital signal at a speed much higher than the speed with which the same process would otherwise be performed by a series of software instructions, solid figures can be displayed at the normal raster speed of a graphic display.

BRIEF DESCRIPTION OF THE DRAWINGS

The present invention will be described in further detail with reference to the accompanying drawings, in which:

FIG. 7 is a block diagram of an interpolator illustrated in FIG. 6a.

PRINCIPLE OF THE INVENTION

Figure 1:
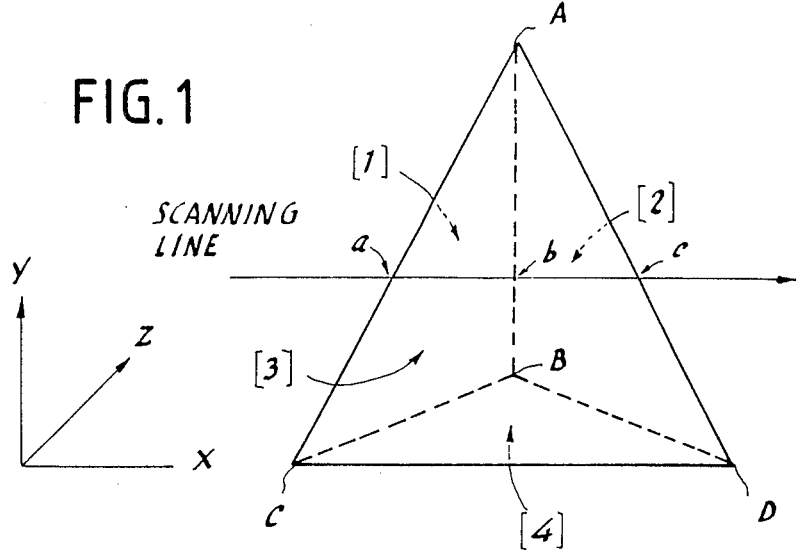
FIGS. 1 to 3 are illustrations of polyhedrons useful for describing the principle of the invention.

Before going into the detail of the present invention, the principle of the invention will first be described with reference to FIGS. 1 to 3, which are illustrations of solid figures to be graphically displayed by the apparatus of the present invention on a real time basis. A triangular pyramid shown in FIG. 1 is defined by a front triangular plane [3], rear triangular planes [1] and [2] and a bottom triangular plane [4] with apexes A, B, C and D. The rear planes [1] and [2] and the bottom plane [4] with the apex B are hidden behind the front plane [3] and thus should appear to be invisible on the video screen. These triangular planes are mathematically expressed by the following Equations:

Plane [1]: $A_1x + B_1y + C_1z = D_1$ (1-1)

Plane [2]: $A_2x + B_2y + C_2z = D_2$ (1-2)

Plane [3]: $A_3x + B_3y + C_3z = D_3$ (1-3)

Plane [4]: $A_4x + B_4y + C_4z = D_4$ (1-4)

where, x, y and z are the axes of a three-dimensional coordinate system in the directions x, y and z shown in FIG. 1 and the A, B and C coefficients represent gradients of the individual planes. The edges of the pyramid comprise picture elements each identified by pictorial information including the plane number, the luminance or color information in the plane of interest and the depth of the picture element measured in the z axis direction. These equations are converted into digital data and stored in a memory as geometrical information together with the individual pictorial information. The stored data are retrieved in a raster fashion at the same rate as the pyramid is scanned in the x direction from left to right. The scanning line first encounters a point a on the edge AC, then intersects the edge AB at b and finally a point c on the edge AD. At point a, geometic information concerning the planes [1] and [2] are read out of the memory. Since the increase in the z value as the scan point moves a given distance in the x direction can be represented by a ratio $A_1/C_1$ in the plane [1] and $A_3/C_3$ in the plane [3], the z values on the planes [1], [2] and [3] can be respectively interpolated along line segments from point a to c by z1, z2 and z3 as follows:

$$z_1 = (A_1/C_1)x + z_a \quad (2\text{-}1)$$

$$z_2 = (A_2/C_2)x + z_b \quad (2\text{-}2)$$

$$z_3 = (A_3/C_3)x + z_a \quad (2\text{-}3)$$

where $z_a$ and $z_b$ are the constants on the z axis at points a and b, respectively.

When color information concerning point a is read out of the memory, geometric information is also derived from Equations 1-1 and 1-3. In a manner, as detailed hereinafter, the geometrical data are used to derive the interpolation values $z_1$ and $z_3$ from Equations 2-1 and 2-3; the values of $z_1$ and $z_3$ which are compared against each other to determine which color information is to be displayed. Since the front plane [3] is nearer to the viewer and has an interpolation value $z_3$ that is the smaller of the two, a gate is opened to pass the color information of plane [3] to a video display and the color information concerning plane [1] is inhibited. This process continues until the scanning spot reaches point b, whereupon the values $z_2$ and $z_3$ are compared against each other and $z_3$, which is still the smaller of the two, causes the gate to open and pass the color information of plane [3].

Figure 2:
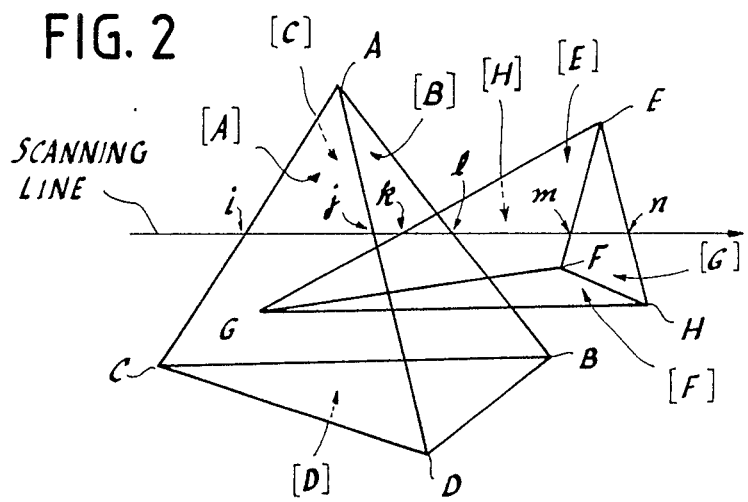
Figure 3:
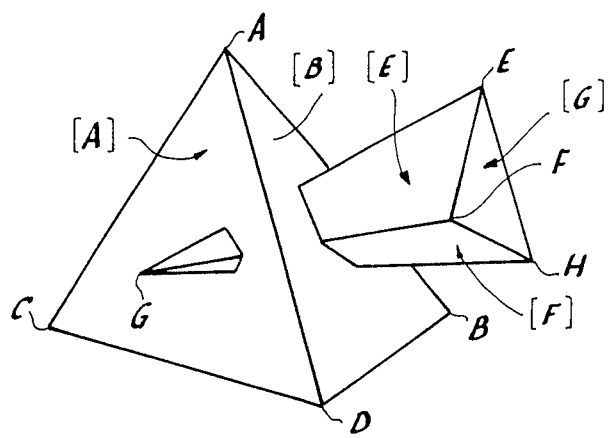

FIG. 2 is an illustration of a set of two intersecting pyramids in which the first pyramid has visible planes [A] and [B] and invisible rear and bottom planes [C] and [D] defined by apexes A, B, C and D, and the second pyramid has visible planes [E], [F], [G] and an invisible rear plane [H] defined by apexes E, F, G and H. The second pyramid penetrates the first so that the boundaries between planes [A], [B] and [C] appear as shown at FIG. 3. These planes are represented as follows:

Plane [A]: $A_a x + B_a y + C_a z = D_a$ (3-a)

Plane [B]: $A_b x + B_b y + C_b z = D_b$ (3-b)

Plane [C]: $A_c x + B_c y + C_c z = D_c$ (3-c)

Plane [D]: $A_d x + B_d y + C_d z = D_d$ (3-d)

Plane [E]: $A_e x + B_e y + C_e z = D_e$ (3-e)

Plane [F]: $A_f x + B_f y + C_f z = D_f$ (3-f)

Plane [G]: $A_g x + B_g y + C_g z = D_g$ (3-g)

Plane [H]: $A_h x + B_h y + C_h z = D_h$ (3-h)

Geometric information represented by these equations is stored in a frame memory together with corresponding color information in a manner as mentioned above. It is assumed that the memory is read so that the scanning line would intersect the edges of the two pyramids at points i, j, k, l, m and n as shown in FIG. 2.

From the foregoing description, the following sets of equations are derived from Equations 3-a to 3-h from comparison to successively choose planes to be displayed as the scanning proceeds along the line segments i-j, j-k, k-l, l-m and m-n:

for line segment i-j:

$$z_A = (A_a/C_a)x + z_i$$

$$z_C = (A_c/C_c)x + z_i$$

for line segment j-k:

$$z_B = (A_b/C_b)x + z_j$$

$$z_C = (A_c/C_c)x + z_i$$

for line segment k-l:

$$z_B = (A_b/C_b)x + z_j$$

$$z_C = (A_c/C_c)x + z_i$$

$$z_E = (A_e/C_e)x + z_k$$

$$z_H = (A_h/C_h)x + z_k$$

for line segment l-m:

$$z_E = (A_e/C_e)x + z_k$$

$$z_H = (A_h/C_h)x + z_k$$

for line segment m-n:

$$z_H = (A_h/C_h)x + z_k$$

$$z_G = (A_g/C_g)x + z_m$$

By comparing the equations in each set, the values $z_A$, $z_B$, $z_E$, and $z_G$ are respectively chosen for line segments i-j, j-k, k-l, l-m and m-n.

Let P represent $z_1$ to $z_4$, $z_A$ to $z_H$, let Q represent $A_1$ to $A_4$, $A_a$ to $A_h$, let R represent $C_1$ to $C_4$, $C_a$ to $C_h$, and let S represent x. The following equation holds:

$$P = (Q/R)S \quad (4)$$

Equation 4 is calculated for each picture element in a video screen. To achieve real time display, the calculation is executed at high speed by an interpolation circuit which is implemented by analog circuit elements.

DESCRIPTION OF THE PREFERRED EMBODIMENT

Figure 4:
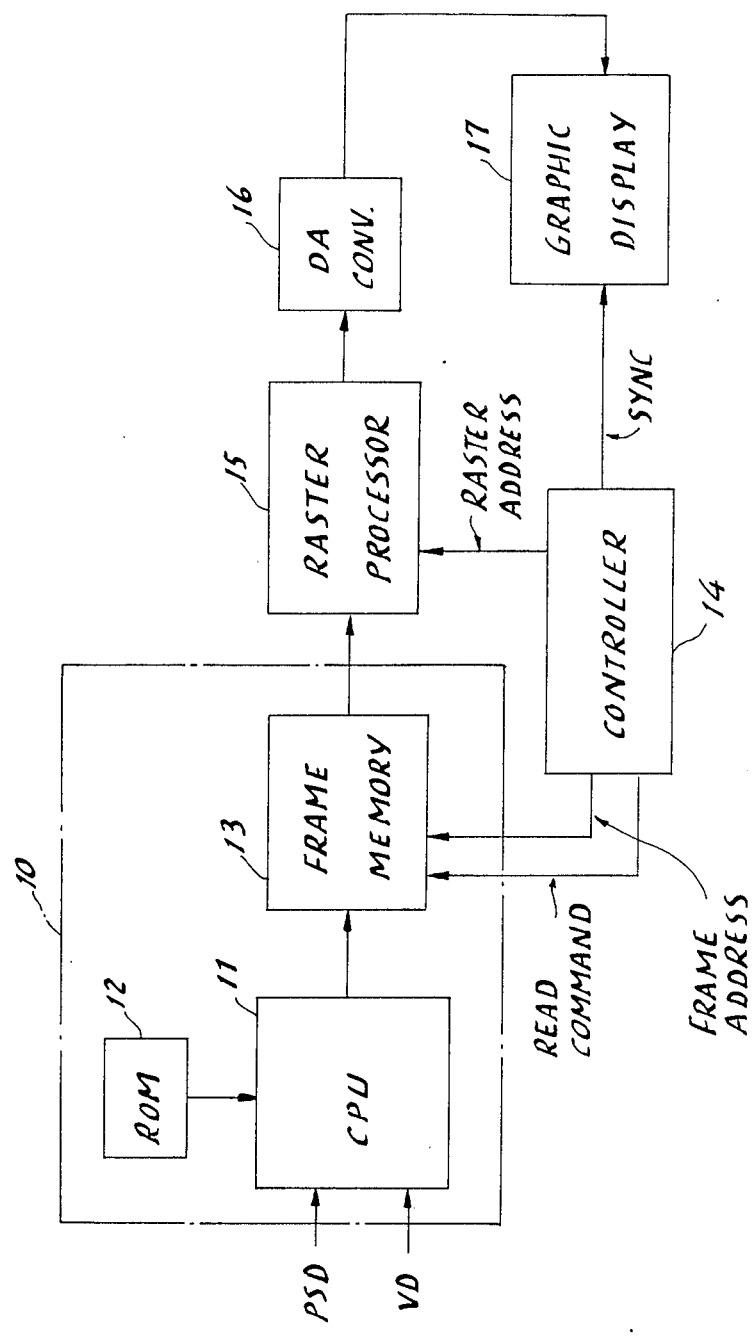
FIG. 4 is a broad block diagram of a graphic display system embodying the invention.
Figure 5:
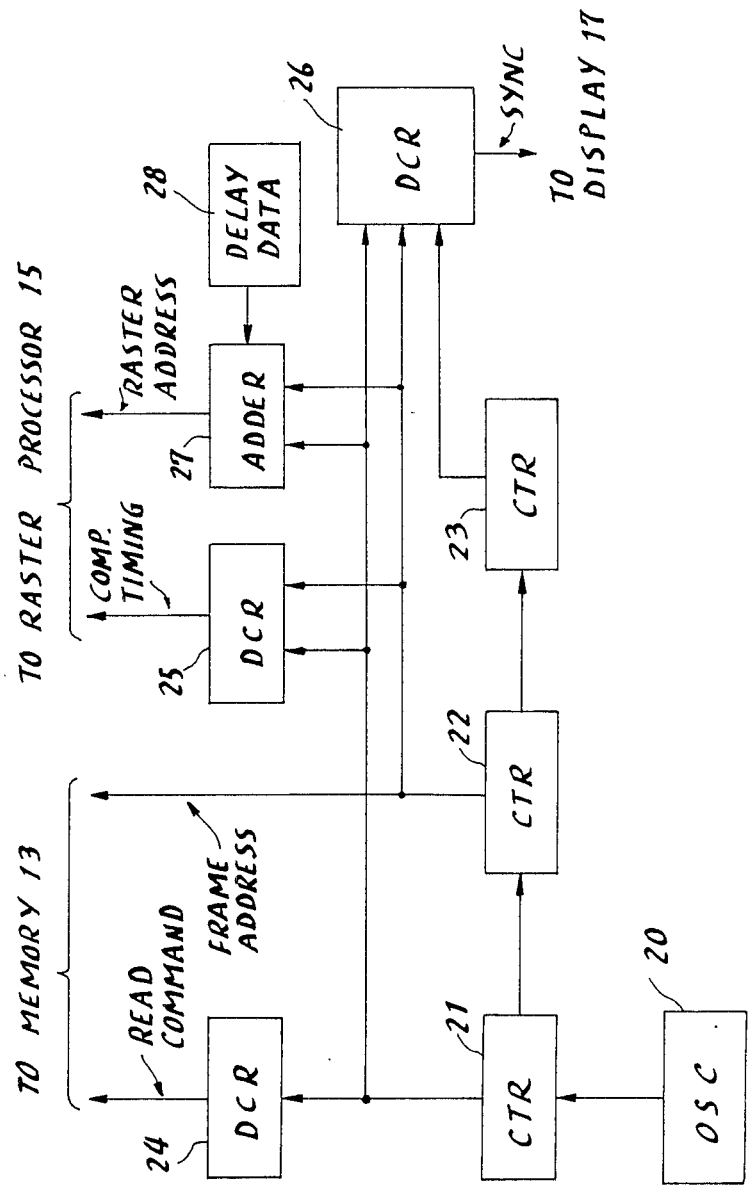
FIG. 5 is a block diagram of details of the controller of FIG. 4.

A preferred embodiment for performing the underlying principles of the invention is shown in FIGS. 4 to 7. In FIG. 4, a computer graphic display system is generally shown as comprising a computer 10 having a central processing unit (CPU) 11, a read-only memory 12 and a random access memory or frame memory 13. The read-only memory 12 stores instructions which are programmed according to any known computer graphic display program. The computer 10 includes an interface through which input data are fed from an external memory to the CPU 11 in a well known manner. The CPU 11 receives presettable data (PSD) from the external memory. Such data typically include the location of each apex of one or more polyhedrons to be displayed, the color and light reflection and diffusion coefficients of each polygonal object, and the location of a light source with which the object or objects are illuminated and the direction of the illuminating light. The CPU also receives variable data (VD) which may include the location and direction of a viewing point with respect to the solid bodies and a viewing angle. The frame memory 13 typically has a capacity of 786,432 bytes of geometrical and pictorial information needed to display a color television image on a full screen size comprising $512 \times 512$ picture elements. The data supplied from the CPU 11 to the frame memory 13 include geometrical information comprising polygonal surface plane identification codes and constants on the z axis and pictorial information on the color and luminance of the surfaces of the three-dimensional objects. Due to the limited capacity of the memory 13, the gradient data P and Q are preferably stored in separate memories to be; the data are read out in response to the plane identification code. As described above, each polyhedron is represented by a plurality of plane equations which are in turn represented by plural edges. Each edge is in turn formed by a multitude of successive picture elements. No information is stored in the frame memory 13 with respect to spaces between edges. The data stored for each picture element comprise (a) a pair of identification codes for planes having adjacent surfaces that share a common edge, (b) the color information codes CL and (c) a z-axis constant Z which indicates the location of the picture element or raster scan point with respect to the origin of the x-y-z coordinate system.

In response to instructions from the read-only memory 12, the CPU (a) executes perspective conversion, (b) performs interpolations for interconnecting apexes, and (c) determines the color and luminance of the polygonal surfaces under the influence of the light source to derive display data which are fed to the frame memory 13.

According to the invention, the system includes a raster processor 15 which is coupled to the frame memory 13 to process data read therefrom in response to a control signal supplied from a controller 14 in a manner as detailed below and feeds digital data to a digital-analog converter 16. An analog signal from the converter 16 is applied to a graphic display unit 17.

Details of the controller 14 and raster processor 15 are shown in FIGS. 5, 6a–6c and 7. The controller 14 comprises a time base clock generator 20, as well as counters 21, 22 and 23 which are coupled in successive stages so that a carry signal from counters 21 and 22 are supplied respectively to later stage counters 22 and 23. Decoders 24, 25 and 26 are coupled to the outputs of the counters 21, 22 and 23 to generate a read command pulse for application to the frame memory 13, a comparator timing pulse for application to the raster processor 15 and a synchronization pulse for application to the display unit 17. The output of the counter 22 is used independently as a frame address code for addressing the frame memory 13. An adder 27 is coupled to the outputs of the counters 21 and 22 and to a circuit 28 which provides it with delay data of a fixed value to position the solid figure in a desired location on the viewing screen. The delay data and the counter outputs are added to provide a raster address code which represents the parameter "S" noted above for application to the raster processor 15.

Figure 6A:
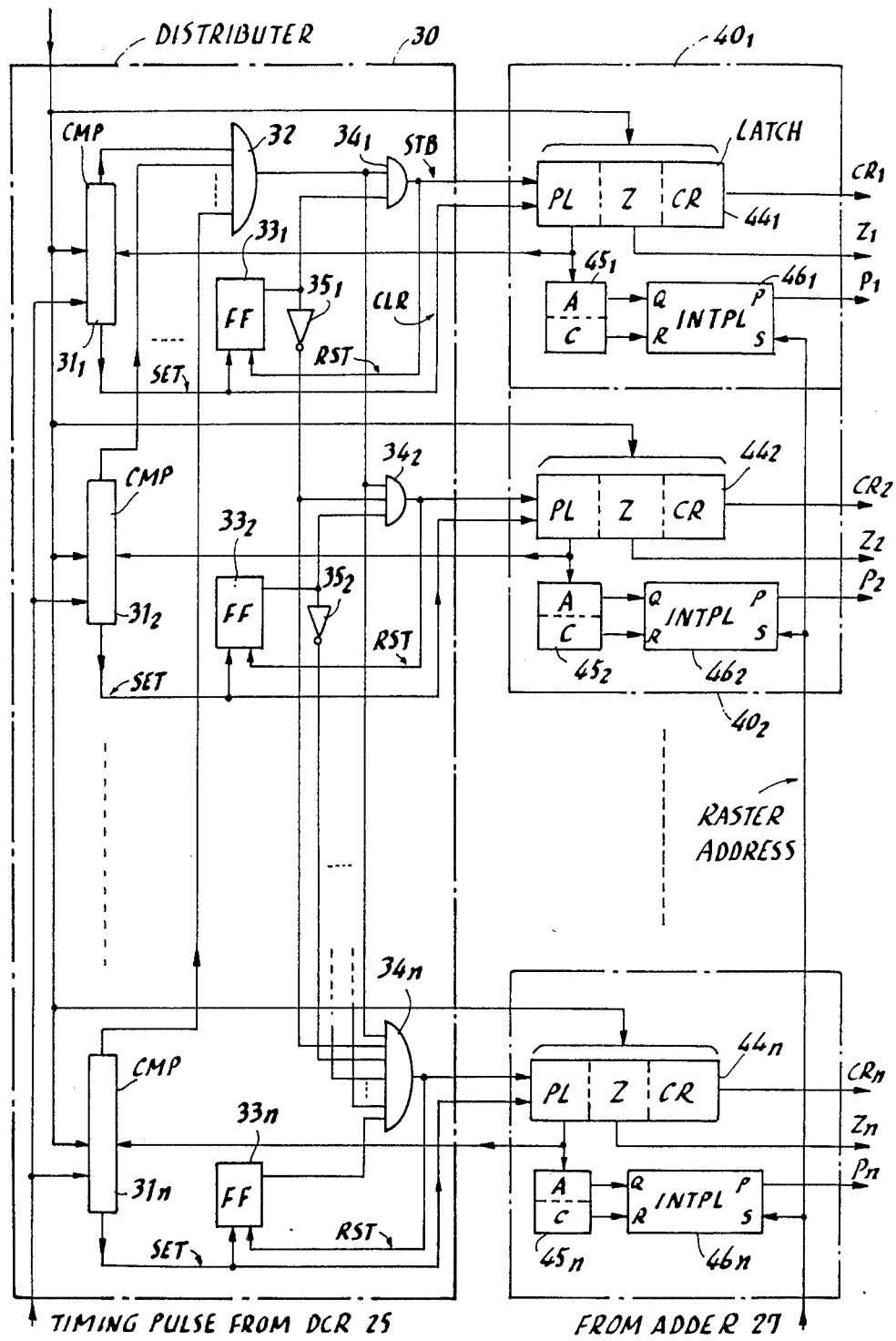
FIGS. 6a to 6c, together, form a block diagram of details of the raster processor of FIG. 4.
Figure 6B:
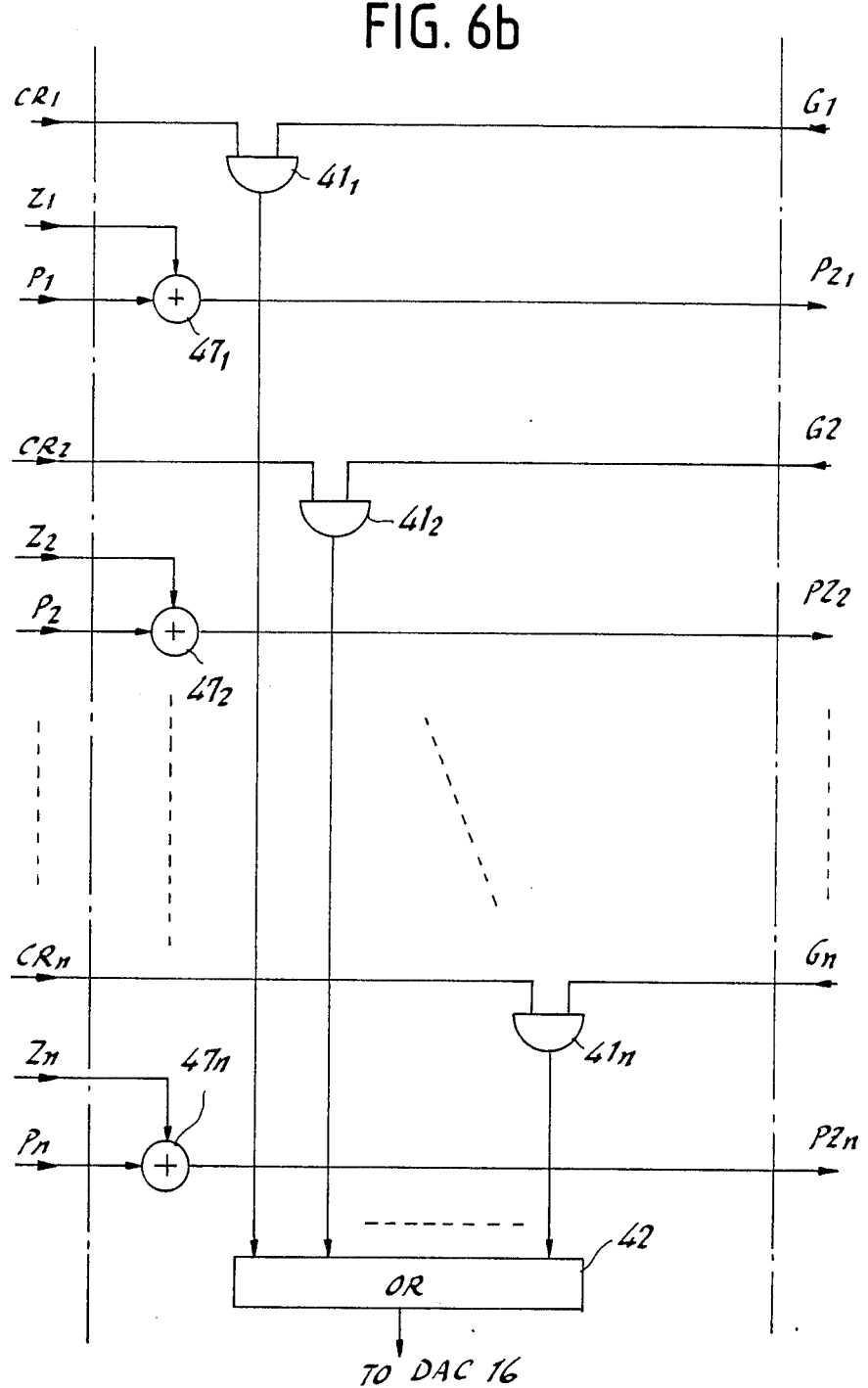

As shown in FIG. 6a, raster processor 14 includes a data distributer 30, a plurality of interpolation units $40_1$ through $40_n$ and a plurality of AND gates $41_1$ through $41_n$ (FIG. 6b), having outputs coupled through an OR gate 42 to the digital-analog converter 16.

In FIG. 6a, data distributer 30 comprises a plurality of comparators $31_1$ through $31_n$ having inputs coupled together to the output of the frame memory 13 to provide a non-coincidence output supplied to AND gate 32 and a coincidence output supplied to set inputs of flip-flops $33_1$ through $33_n$. The output of the AND gate 32 is connected to first input terminals of AND gates $34_1$ through $34_n$ having outputs respectively coupled to reset inputs of flip-flops $33_1$ through $33_n$. The output of flip-flop $33_1$ is connected to the second input terminal of AND gate $34_1$. An inverter $35_1$ is connected to the output of flip-flop $33_1$ to supply an inverted signal to second input terminals of AND gate $34_2$ through $34_n$. Likewise, the output of flip-flop $33_2$ is connected to a third input terminal of AND gate $34_2$. An inverter $35_2$, coupled to the output of flip-flop $33_2$, supplies an inverted signal to third input terminals of AND gates $34_3$ through $34_n$. Therefore, the presence of a high-level output at one of flip-flops $33_1$ through $33_{n-1}$ inhibits one or more AND gates 34 having lower priorities represented by the subscript to the reference numeral 34.

Each interpolation unit 40 comprises a latch 44, a RAM 45 and an interpolator 46, the operation of which is described later in detail with reference to FIG. 7. The latches $44_1$ to $44_n$ are connected to respond to input data signals representing, inter alia, the plane number identification code PL, z-axis code Z and the color information CR from the memory 13 and store them in respective storage locations as identified PL, Z and CR in response to a strobe pulse derived from the AND gates $34_1$ through $34_n$, respectively. The latches $44_1$ to $44_n$ are respectively cleared by a coincidence indicating output derived from the comparators $31_1$ through $31_n$, and in response to the synchronization pulse derived from the decoder 26. After such clearing operation, the latches are loaded with maximum value data which indicate that they are empty.

The storage location PL of each latch is coupled to the associated comparator 31 for detecting a coincidence between the information stored therein and the corresponding information derived from the memory 13. Therefore, if the input plane identification code from the memory 13 does not match with the corresponding code stored in any of the latches 44, non-coincidence outputs are generated by comparators $31_1$ through $31_n$ and the AND gate 32 enables the AND gates $34_1$ through $34_n$. Flip-flops $33_1$ through $33_n$ are initially set to a high output state so that AND gate $34_1$ is initially activated upon the arrival of a series of input data, thus providing a strobe pulse to the latch $44_1$, while inhibiting AND gates $33_2$ to $33_n$.

The reading operation of the frame memory 13 begins in response to the read command signal from the decoder 24 with proper timing to read data from storage locations determined by frame address data from the counter 22. On the other hand, the synchronization pulse from the decoder 26 indicates the start of each horizontal line scan in the display unit 17.

The operation of the raster processor 15 is best understood with reference to FIG. 2. When the raster scan on the video screen of the display 17 reaches a point i in FIG. 2, first and second data are serially read out of the memory 13 into the data distributer 30. The first data include the plane identification code $PL_a$ identifying the plane [A], the z-axis data $z_i$ and color information $CR_a$ of the plane [A], and the second data include the plane identification code $PL_c$ identifying the hidden plane [C], the z-axis data $z_i$ and color information $CR_c$ of the plane [C]. The first data are applied to all the comparators 31 of the distributer 30 and compared with the data supplied from the associated latches in response to the comparator timing pulse from the decoder 25. Since all the latches are loaded with maximum value data at the start of each horizontal scan, of comparators 31 generate non-coincidence outputs and a strobe pulse is applied to the latch $44_1$ which stores the first data supplied to it. Likewise, the second data are stored in latch $44_2$ after comparison of all the data stored in the latches $44_1$ through $44_n$.

Each of the random access memories 45 stores a first set of gradient, or direction cosine data A and a second set of gradient data C. If the solid polyhedrons have an adjacent angle which is close to 90 degrees, there would be a large number of digits if data A were represented by integers. For this reason, data A are given by a real number expressed in floating point representation. Specifically, the real number is expressed by an exponent and a mantissa. These gradient data are stored in locations addressible as a function of the plane identification code, so that the gradient data addressed in RAM $45_1$ by code $PL_a$ in latch $44_1$ represent data $A_a$ and $C_a$ as expressed in Equation 3-a and those addressed in RAM $45_2$ by code $PL_c$ in latch $44_2$ represent data $A_c$ and $C_c$ of Equation 3-c. The $A_a$ and $C_a$ data are supplied respectively as Q and R values of Equation 4 to the associated interpolator 46-1 and the $A_c$ and $C_c$ data are likewise supplied to the interpolator $46_2$. The color information CR is applied through lines $CR_1$ to $CR_n$ to first input terminals of the AND gates $41_1$ to $41_n$, respectively.

As detailed later, each of interpolators 46 comprises an analog circuit which computes Equation 4 at speed comparable to the operating speed of analog circuitry as a function of the raster address data S from the adder 27 to derive the P value. The P-value output signals of the interpolators $44_1$ through $44_n$ are coupled by lines $P_1$ through $P_n$ to floating-point adders $47_1$ to $47_n$, respectively, to which are also applied the z-axis data from the latches $44_1$ to $44_n$ on lines $Z_1$ through $Z_n$ to generate summed outputs (P+z) which indicate the depths of different planes as measured on the z-axis. The outputs of the adders $47_1$ through $47_n$ are coupled by way of lines $PZ_1$ to $PZ_n$ to a minimum value detector 50, FIG. 6c, which detects the smallest of the summed P values and applies an enable pulse through lines $G_1$ to $G_n$ to one of AND gates $41_1$ through $41_n$ to allow the color information associated with the smallest P value to be coupled to OR gate 42 and thence to the digital-analog converter 16.

Thus, interpolators $46_1$ and $46_2$ generate signals representing interpolation values $P_a$ and $P_c$ for planes [A] and [C] respectively. These signals are respectively applied via lines $P_1$ and $P_2$ to adders $47_1$ and $47_2$ and summed with the $z_j$ values supplied to lines $Z_1$ and $Z_2$ from the latches $46_1$ and $46_2$ to provide a pair of summed outputs $(Pa+z_i)$ and $(Pc+z_i)$.

Figure 6C:
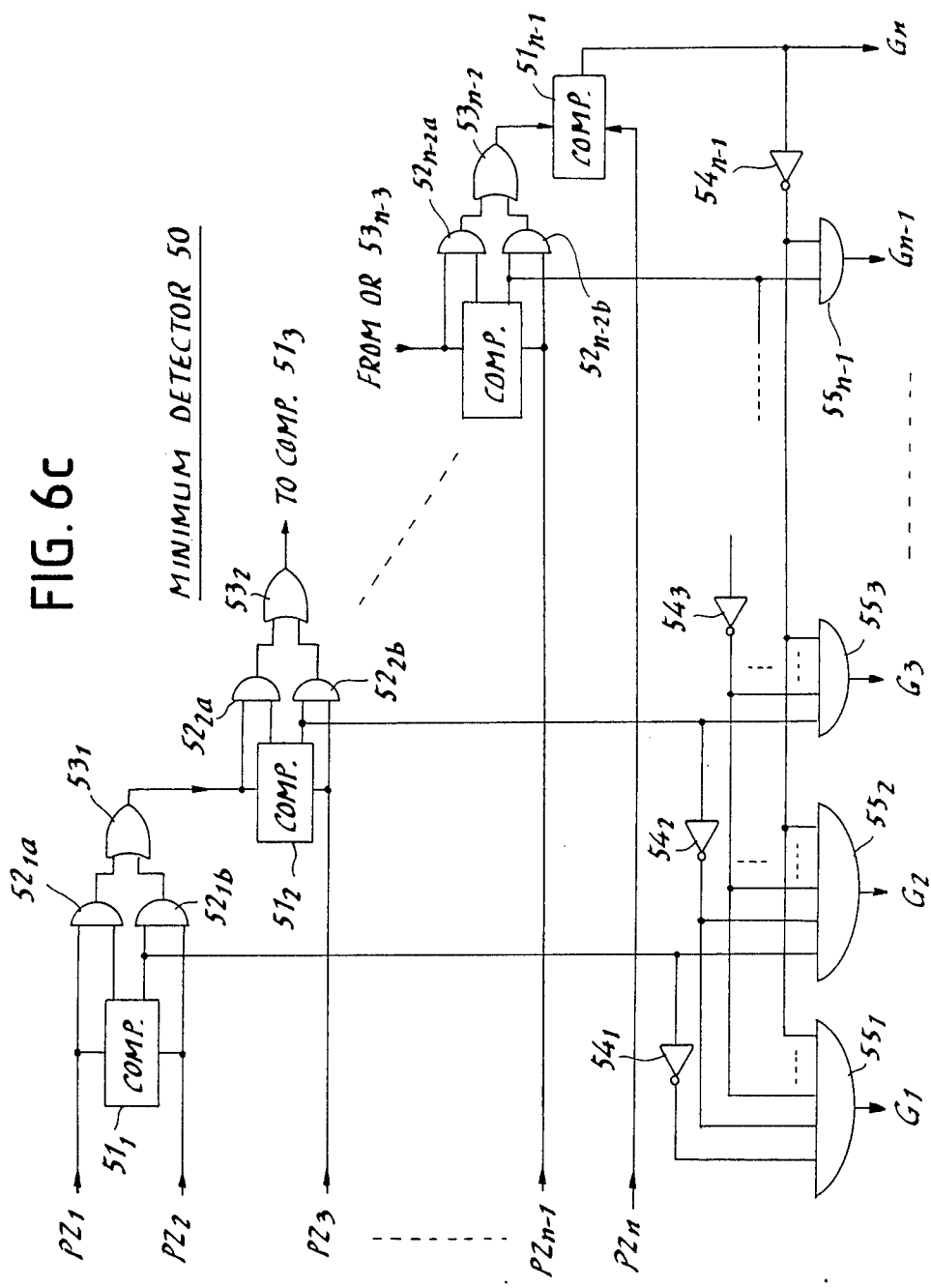

Referring to FIG. 6c, the minimum detector 50 comprises a plurality of comparators $51_1$ through $51_{n-1}$, a plurality of AND gates $52_{1a}$, $52_{1b}$ through $52_{n-2a}$, $52_{n-2b}$, in pairs and a plurality of OR gates $53_1$ through $53_{n-2}$. The comparator $51_1$ has first and second input terminals respectively coupled to the lines $PZ_1$ and $PZ_2$ to detect the smaller of the signals applied thereto. Comparator $51_1$ has first and second output terminals respectively coupled to AND gates $52_{1a}$ and $52_{1b}$ to enable one of these AND gates to allow the detected input signal to pass through it to OR gate $53_1$ and thence to the comparator $51_2$ where it is compared with the signal on lead $PZ_3$ so that the signals passed through OR gate $53_2$ is the smallest of the signals on lines $PZ_1$, $PZ_2$ and $PZ_3$.

Therefore, the output signal of OR gate $53_{n-2}$ is the smallest of the signals applied to lines $PZ_1$ through $PZ_{n-1}$ and compared with the signal on line $PZ_n$ in the comparator $51_{n-1}$ which produces a high-level signal when the signal on line $PZ_n$ is the smallest value on its output terminal which corresponds in function to the second output terminal of the other comparators.

The second output terminal of each of comparators $51_1$ through $51_{n-1}$ is respectively connected by way of inverters $54_1$ through $54_n$ to an AND gate $55_1$, so that the latter is activated when the signal on $PZ_1$ has the smallest value. The second output of the comparator $55_1$ is further coupled to an AND gate $55_2$ to which the outputs of inverters $54_2$ to $54_{n-1}$ are also applied. Thus, AND gate $55_2$ is activated when the signal on lead $PZ_2$ has the smallest value. Likewise, the second output of comparator $51_2$ is coupled to an AND gate $55_3$ to which the outputs of inverters $54_3$ to $54_{n-1}$ are also connected to activate the AND gate $55_3$ when the signal on lead $PZ_3$ is of the smallest value. The outputs of the AND gates $55_1$ to $55_{n-1}$ are respectively connected to AND gates $41_1$ to $41_{n-2}$ and the output of comparator $51_{n-1}$ is connected to AND gate $41_n$.

The summed signals $(Pa+z_i)$ and $(Pc+z_i)$ are compared in the comparator $51_1$. Since the plane [A] is nearer to the viewer and hence the signal $(Pa+z_i)$ is smaller than signal $(Pc+z_i)$, AND gate $52_{1a}$ is enabled to pass the signal $(Pa+z_i)$ to the comparator $51_2$. Because the remainder latches are loaded with maximum values at this moment, the signals on lines $PZ_3$ to $PZ_n$ are of the highest value and thus AND gate $55_1$ is activated; activating gate $55_1$ enables AND gate $41_1$ to pass the color information $CR_a$ on line $CR_1$ to the digital-analog converter 16 via OR gate 42 when the scan point reaches point j. At this time third and fourth data respectively associated with planes [A] and [B], are retrieved from the frame memory 13 and applied to the data distributer 30. Since the plane identification code of the third data are exactly the same as the plane identification code of the first data stored in latch $44_1$, the comparator $31_1$ detects a match between them and issues a coincidence output to the latch $44_1$. The contents of the latter are replaced with maximum value data, while the contents of the latch $44_2$ remain unchanged since the flip-flop $33_2$ is in the low-output state to disable AND gate $34_2$.

The fourth data include plane identification code $PL_b$ for plane [B], z-axis data $z_j$ and color information $CR_b$. The fourth data are subsequently applied to the distributer 30. Since the latch $44_1$, now loaded with maximum value data, has the highest priority in the selection of the latches, and since the flip-flop $33_1$ is in a high output state enabling the gate $34_1$, the fourth data for plane [B] are loaded into latch $44_1$. Interpolator $46_1$ now provides an interpolation signal Pb which is applied on line $P_1$ to the adder $47_1$ and summed with the $z_j$ value signal derived from latch $44_1$, generating a sum output $(Pb+z_j)$ for comparison with the summed output $(Pc+z_i)$ derived from the interpolation unit $40_2$. This comparison is made by the comparator $51_1$ in a manner similar to that described with reference to the previous scan point. Since the plane [B] is closer than plane [C] to the viewer, the comparator $51_1$ enables AND gate $52_{1a}$ to pass the signal $(Pb+z_j)$ to other comparators for further comparison with maximum value data supplied from other latches. Gate $55_1$ is activated to enable AND gate $41_1$ to pass the color information $CR_b$ to the digital-analog converter 16. This continues until point k is reached on the display. Thus, AND gate $41_1$ remains activated during the time the raster scan point traverses from point i to point k.

At point k, the fifth and sixth data ($PL_e$, $z_k$, $CR_e$ and $PL_h$, $z_k$, $CR_h$) regarding the planes [E] and [H] are read sequentially out of the memory 13 and fed to the distributer 30 which, in a manner described above, loads them into the latches $44_3$ and $44_4$ (not shown), respectively. Data regarding the planes [B], [C], [E] and [H] are now stored in latches $44_1$, $44_2$, $44_3$ and $44_4$ and interpolation values Pb, Pc, Pe and Ph corresponding with them are compared against each other in the minimum detector 50. Since the plane [E] is the closest to the viewer, AND gate $41_1$ is deactivated and AND gate $41_3$ is activated to pass the color information $CR_e$ to digital-to-analog converter 16.

At point l, the same data as now stored in latches $44_1$ and $44_2$ are read out of the memory 13. The data on planes [B] and [C] are cancelled and the data on planes [E] and [H] are maintained in the latches $44_3$ and $44_4$, allowing the color information $CR_c$ to be displayed until point m is reached. At point m, the data for planes [E] and [G] are retrieved. The data for plane [E] stored in latch $44_3$ are cancelled due to the coincidence with the now retrieved data for plane [E] and the new data for plane [G] are loaded into latch $44_3$. Interpolation signals Ph and Pg are summed with respective z-axis values $z_k$ and $z_m$ to provide summed outputs for comparison with each other to select the color information $CR_g$ for plane [G] to be displayed until point n is reached.

Figure 7:
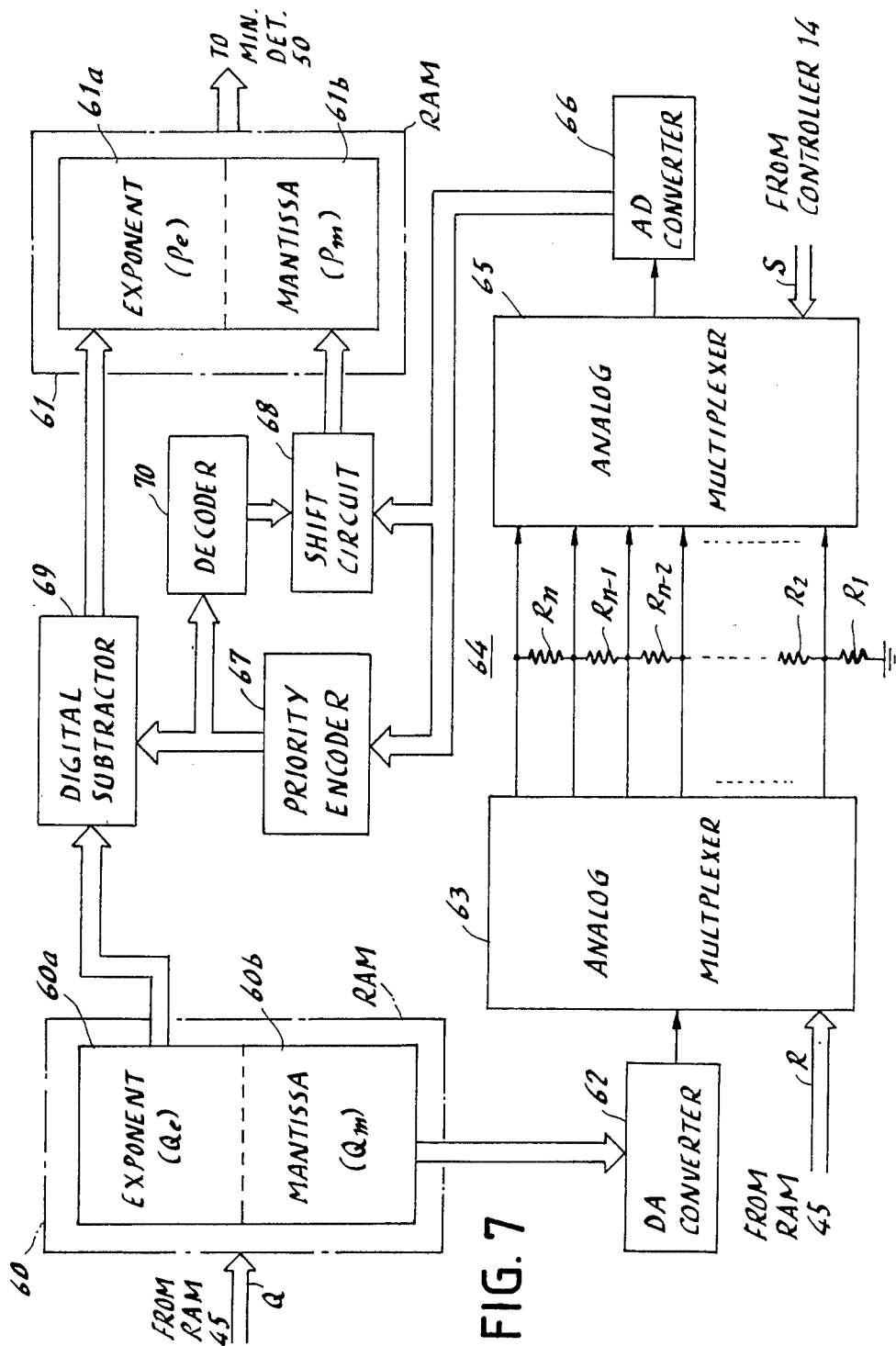

Referring to FIG. 7, there is shown a preferred form of the interpolator 44. The interpolator comprises input and output RAMs 60 and 61. The input RAM 60 is divided into two storage areas 60a and 60b to which the exponent and mantissa parts of the gradient data A are respectively transferred from RAM 45 of interpolation unit 40 and stored as the exponent (Qe) and mantissa (Qm) of a digital value Q corresponding to the gradient A value. A digital-analog converter 62 is coupled to the input memory 60 to read the mantissa part (Qm) of the transferred data for conversion to a corresponding analog value for application to a first analog multiplexer 63. This multiplexer is responsive to the gradient data C stored in RAM 45, which is received as a value R, to selectively couple the analog converted signal to one of its output terminals. A resistor network 64 has a plurality of resistors R1 through Rn, preferably having equal resistance values connected in a series circuit to form taps between successive resistors, the taps being connected to the output terminals of the analog multiplexer 63. The resistors R1 to Rn correspond in number to the integral value R.

The voltage representing Qm is converted by the resistor network 64 into incremental values and the voltage at each different tap is proportional to the Qm value and inversely proportional to the R value.

A second analog multiplexer 65 has a plurality of input terminals connected to the taps of the resistor network 64 to selectively couple the incremental voltages to its output terminal as a function of the raster address data S. The voltage developed at the output of analog multiplexer 65 is converted to a corresponding digital value Pm' in an analog-digital converter 66. Since the value Pm' is an interpolation of the mantissa Qm and no longer exceeds the latter, the most significant digit of the significant figure of Pm' is shifted so that it justifies to the most significant digit of a mantissa. For this reason, the digitally converted signal is applied to a priority encoder 67 and also to a known shift circuit 68 which essentially comprises a chain of flip-flops or gates. The priority encoder 67, which is typically of the type SN 74148 available from Texas Instruments, detects the number of zeros present in the digit positions higher than the most significant digit of the significant figure Pm'. Encoder 67 derives an output that is applied to a digital subtractor 69 and to a decoder 70. In the subtractor 69 the detected zero number is subtracted from the exponent value Qe supplied from the memory area 60a of the input RAM 60 to derive an exponent Pe which is stored in storage area 61a of the output RAM 61. The decoder 70 translates the output of the priority encoder 67 into a form appropriate for opening those gates of the shift circuit 68 which correspond in number to the amount of shift, so that the bit positions of the binary data Pm' supplied thereto from the analog-digital converter 66 are shifted by the same number of detected zeros, providing a new mantissa Pm which is stored in storage area 61b of the output RAM 61. The exponent Pe and mantissa Pm stored in the RAM 61 are combined to give an interpolation value of the real number P and fed to the minimum detector 50.

Because of the high speed capability of the hardware, the interpolation data can be obtained at a speed $10^2$ to $10^3$ times higher than the speed of software computation steps. The embodiment as taught by the invention allows solid figures to be graphically displayed on a real time basis, and thus real time display of solid figures can be achieved economically.

The foregoing description shows only a preferred embodiment of the present invention. Various modifications are apparent to those skilled in the art without departing from the scope of the present invention which is only limited by the appended claims. Therefore, the embodiments shown and described are only illustrative, not restrictive.

What is claimed is:

1. In a system for displaying a three-dimensional object defined by a plurality of planes on a two-dimensional raster screen, each of the planes being represented by an equation $Ax+By+Cz=D$, where x, y and z are the axes of a three-dimensional coordinate system and A, B and C are integers proportional to the direction cosines of each of said planes and D is a constant, the x- and y-axes respectively extending in horizontal and vertical directions and the z-axis extending in a depth direction perpendicular to said x- and y-axes, wherein said direction cosine A being represented by an exponent and a mantissa, said system including means for generating first, second and third digital signals representing respectively said exponent, mantissa and integer C, a circuit arrangement comprising:

a digital-to-analog converter for converting said second digital signal into a mantissa representing voltage;

a plurality of series connected resistors having a plurality of taps between successive resistors;

first switching means for applying said mantissa representing voltage to one of said taps in response to said third digital signal to develop incremental potentials at said taps;

an analog-to-digital converter;

second switching means for selectively applying said incremental potentials to said analog-to-digital converter in accordance with the location of a raster scan point on said screen;

means for shifting the output of said analog-to-digital converter in digit position so that it justifies to a most significant digit position; and means for subtracting the number of the shifted digit positions from the first digital signal, the outputs of the subtracting means and shifting means representing an incremental depth of each of said planes at said raster scan point.

2. A circuit arrangement as claimed in claim 1, wherein said first switching means comprises a first analog multiplexer responsive to said second digital signal for coupling the output of said digital-to-analog converter to one of said taps and said second switching means comprises a second analog multiplexer responsive to a digital signal representing the location of said raster scan point for selectively coupling said incremental potentials to said analog-digital converter.

3. A method for displaying a three-dimensional object defined by a plurality of planes on a two-dimensional raster screen, each of the planes being represented by an equation $Ax+By+Cz=D$, where x, y and z are the axes of a three-dimensional coordinate system and A, B and C are integers proportional to the direction cosines of each of said planes and D is a constant, the x- and y-axes respectively extending in horizontal and vertical directions and the z-axis extending in a depth direction perpendicular to said x- and y-axes, comprising the steps of:

(a) generating, for each raster scan point on the x-axis, first and second digital signals representing respectively said integers A and C and a third digital signal representing the location of a raster scan point on said z-axis and storing a plurality of data sets each comprising said first, second and third digital signals and a pictorial signal in locations addressable as a function of the location of a raster scan point on said x-axis;

(b) reading a said data set as a function of said location of raster scan point on said x-axis;

(c) converting said first digital signal of the read data set into a corresponding voltage;

(d) applying said voltage to one of a plurality of taps between series-connected resistors as a function of said second signal of said read data set to generate incremental potentials at said taps;

(e) selecting one of said incremental potentials as a function of the location of the raster scan point on said x-axis;

(f) converting the selected potential to a corresponding digital signal;

(g) summing the converted digital signal with said third digital signal of the read data set;

(h) comparing in magnitude the summed digital signal with a previously derived summed digital signal to detect the digital signal having a smallest magnitude;

(i) displaying the pictorial signal associated with the detected digital signal on said screen; and (j) repeating the steps (b) to (h).

4. A graphic display system for providing a display of a three-dimensional object defined by a plurality of planes on a two-dimensional raster screen, each of the planes being represented by an equation $Ax+By+Cz=D$, where x, y and z are the axes of a three-dimensional coordinate system and A, B and C are integers proportional to the direction cosines of each of said planes and D is a constant, the x- and y-axes respectively extending in horizontal and vertical directions and the z-axis extending in a depth direction perpendicular to said x- and y-axes, comprising:

means for generating a raster-scan address signal representing the location of a raster scan point on said x-axis;

a memory storing a plurality of data sets each comprising first, second and third geometrical digital signals and a pictorial digital signal for each raster scan point, said first and second signals representing the integers A and C respectively, said third signal representing the location of the raster scan point on said z-axis each data set being stored in a location addressable in response to said raster scan address signal;

a plurality of latches;

means for addressing said memory in response to said address signal and transferring the contents of each data set from the addressed location to one of said latches;

a plurality of interpolators associated respectively with said latches, each interpolator including a first digital-to-analog converter for converting said first signal from the associated latch into a corresponding voltage, an analog proportioning circuit for proportioning said voltage as a function of said second digital signal and said address signal to generate an interpolated voltage, and an analog-to-digital converter for converting the interpolated voltage to an interpolation representative digital signal;

means for summing the interpolation representative digital signals derived from said interpolators respectively with the third signals stored in the latches associated with said interpolators;

means for comparing in magnitude the summed digital signals with each other to detect the digital signal having a smallest magnitude;

a second digital-to-analog converter;

means for applying the pictorial signal associated with the detected digital signal to said second digital-to-analog converter; and display means connected to the output of said second digital-to-analog converter for displaying the output signal therefrom.

5. A graphic display system for providing a display of a three-dimensional object defined by a plurality of planes on a two-dimensional raster screen, each of the planes being represented by an equation $Ax+By+Cz=D$, where x, y and z are the axes of a three-dimensional coordinate system and A, B and C are integers proportional to the direction cosines of each of said planes and D is a constant, the x- and y-axes respectively extending in horizontal and vertical directions and the z-axis extending in a depth direction perpendicular to said x- and y-axes, wherein said direction cosine A is represented by an exponent and a mantissa, comprising:

a first memory storing a plurality of data sets each comprising a plane identification code and a raster-scan address code indicating the location of a raster scan point on said z-axis, and a pictorial digital signal;

a plurality of latches;

means for successively addressing the locations of said first memory as a function of said raster scan point on the z-axis and transferring the contents of the addressed location to one of said latches;

a plurality of interpolators associated respectively with said latches, each of the interpolators comprising:

a memory storing a plurality of data sets associated respectively with said planes, each data set comprising first and second digital signals representing said exponent and mantissa respectively and a third digital signal representing said integer C, each of said data sets being stored in a location addressable in response to the plane identification code supplied from the associated latch;

a first digital-to-analog converter for converting said second digital signal to a mantissa representative voltage;

an analog proportioning circuit for proportioning said voltage as a function of said second digital signal and said address signal to generate an interpolated mantissa representing voltage;

an analog-to-digital converter for converting the interpolated voltage to an interpolated mantissa representative digital signal;

means for shifting said interpolated mantissa representative digital signal in digit position so that it justifies to a most significant binary position; and means for subtracting the number of the shifted digit positions from said first digital signal to generate an interpolated exponent representative digital signal, the interpolated exponent and mantissa representative digital signals representing the depth of each of said planes at said raster scan point;

means for summing the exponent and mantissa representative digital signals derived respectively from said interpolators with the third digital signals stored in the latches respectively associated with said interpolators;

means for detecting the summed digital signal having a least magnitude from the summed digital signals derived from all of said interpolators;

a second digital-to-analog converter;

means for applying the pictorial signal associated with the detected digital signal to said second digital-to-analog converter; and display means for providing a display of the output of said second digital-to-analog converter on said screen.

6. A graphic display system as claimed in claim 5, wherein said analog proportioning circuit comprises:

a plurality of series connected resistors having a plurality of taps between successive resistors;

first switching means for applying said mantissa representative voltage to one of said taps in response to said third digital signal to develop incremental potentials at said taps; and second switching means for selectively applying said incremental potentials to said analog-to-digital converter in response to said address signal.

* * * * *